(12) United States Patent
Garcia Andujar et al.

(10) Patent No.: US 8,836,154 B2
(45) Date of Patent: Sep. 16, 2014

(54) WIND TURBINE CONTROL METHODS FOR IMPROVING THE PRODUCTION OF ENERGY

(75) Inventors: Juan Carlos Garcia Andujar, Madrid (ES); Jose María Lopez Rubio, Madrid (ES)

(73) Assignee: Gamesa Innovation & Technology, S.L., Sarriguren (ES)

( * ) Notice: Subject to any disclaimer, the term of this patent is extended or adjusted under 35 U.S.C. 154(b) by 286 days.

(21) Appl. No.: 13/503,142

(22) PCT Filed: Oct. 20, 2010

(86) PCT No.: PCT/ES2010/070672
§ 371 (c)(1),
(2), (4) Date: Apr. 20, 2012

(87) PCT Pub. No.: WO2011/048251
PCT Pub. Date: Apr. 28, 2011

(65) Prior Publication Data
US 2012/0205913 A1   Aug. 16, 2012

(30) Foreign Application Priority Data
Oct. 23, 2009   (ES) .................................. 200902030

(51) Int. Cl.
*F03D 9/00*   (2006.01)
*F03D 7/02*   (2006.01)
*F03D 7/04*   (2006.01)

(52) U.S. Cl.
CPC ............ *F03D 7/0276* (2013.01); *Y02E 10/723* (2013.01); *F03D 7/028* (2013.01); *F05B 2270/103* (2013.01); *F03D 7/043* (2013.01); *F05B 2270/20* (2013.01); *F05B 2270/101* (2013.01)

USPC ................................................ 290/44; 290/55

(58) Field of Classification Search
CPC ..... F03D 7/028; F03D 7/1046; Y02E 10/723; F05B 2270/32; F05B 2270/327; F05B 2270/328; F05B 2270/1016
USPC ....................................................... 290/44, 55
See application file for complete search history.

(56) References Cited

U.S. PATENT DOCUMENTS

| 4,703,189 | A | 10/1987 | DiValentin et al. |
| 7,352,075 | B2 * | 4/2008 | Willey et al. .................. 290/44 |
| 7,704,043 | B2 * | 4/2010 | Kabatzke et al. ................ 416/1 |
| 2006/0273595 | A1 | 12/2006 | Avagliano et al. |
| 2008/0042441 | A1 | 2/2008 | Kabatzke |
| 2008/0116690 | A1 | 5/2008 | Kabatzke et al. |

* cited by examiner

*Primary Examiner* — Tho D Ta
(74) *Attorney, Agent, or Firm* — Ladas & Parry LLC

(57) ABSTRACT

Method of operation of a variable speed wind turbine (11) having control means for its regulation tracking a power vs. generator speed curve (31) comprising a nominal zone (39) where the power is kept constant at a nominal value, a first sub-nominal zone (33) where the generator speed is kept constant at its coupling value, a second sub-nominal zone (35) where both generator speed and power are allowed to increase/decrease in line with wind speed and a third sub-nominal zone (37) between the second sub-nominal zone (35) and the nominal zone (39) that comprises a first vertical segment (41) at a generator speed $n_{r2}$ higher than the generator nominal speed $n_{r1}$ and a second vertical segment (43) at the generator nominal speed $n_{r1}$ connecting with the nominal zone (39), each of both segments (41, 43) to be followed in function of the wind speed changes for optimizing the energy production.

7 Claims, 5 Drawing Sheets

WIND TURBINE CONTROL METHODS FOR IMPROVING THE PRODUCTION OF ENERGY

RELATED APPLICATION INFORMATION

This application is a 371 of International Application PCT/ES2010/070672 filed 20 Oct. 2010 entitled "WIND TURBINE CONTROL METHODS FOR IMPROVING THE PRODUCTION OF ENERGY", which was published on 28 Apr. 2011, with International Publication Number WO 2011/048251 A1, and which claims priority from Spanish Patent Application 200902030, filed 23 Oct. 2009, the content of which is incorporated herein by reference.

FIELD OF THE INVENTION

The invention relates to variable speed wind turbine control methods and, in particular, to variable speed wind turbine control methods for improving the production of energy.

BACKGROUND

Wind turbines are devices that convert mechanical energy to electrical energy. A typical wind turbine includes a nacelle mounted on a tower housing a drive train for transmitting the rotation of a rotor to an electric generator and other components such as a yaw drive which rotates the wind turbine, several controllers and a brake. The rotor supports a number of blades extending radially therefrom for capturing the kinetic energy of the wind and causing the driving train rotational motion. The rotor blades have an aerodynamic shape such that when a wind blows across the surface of the blade, a lift force is generated causing the rotation of a shaft which is connected—directly or through a gearing arrangement—to the electrical generator located inside the nacelle. The amount of energy produced by wind turbines is dependent on the rotor blade sweeping surface that receives the action from the wind and consequently increasing the length of the blades leads normally to an increase of the power output of the wind turbine.

Under known control methods and systems the power produced by a wind turbine increases with wind speed until a rated nominal power output is reached and then it is maintained constant. This is done regulating the pitching action of the blades so that the rotor blade's pitch angle is changed to a smaller angle of attack in order to reduce power capture and to a greater angle of attack to increase the power capture. Therefore the generator speed, and consequently, the power output may be maintained relatively constant with increasing wind velocities.

As it is well known the limitation of the rotational speed of wind turbines implies a limitation of the wind turbine loads and also a limitation of the wind energy captured with respect to the wind energy available. Then, the wind energy industry is permanently demanded improved wind turbine control methods for optimising its efficiency.

There are several known methods addressing said demand. One of them is disclosed in US 2007/0154311: a method for torque and pitch control according to the rotational speed for delivering a higher output.

This invention is addressed to attention of the same demand avoiding the drawbacks of the known prior art.

SUMMARY OF THE INVENTION

It is an object of the present invention to provide wind turbines controlled by control methods that allow the optimization of the energy production.

It is another object of the present invention to provide wind turbine control methods adapted for optimizing the energy production in the power curve zones around the nominal generator speed.

In one aspect, these and other objects are met by providing a method of controlling the operation of a variable speed wind turbine, tracking a power vs. generator speed curve comprising a nominal zone where the power is kept constant at a nominal value, a first sub-nominal zone where the generator speed is kept constant at its coupling value, a second sub-nominal zone where both generator speed and power are allowed to increase/decrease in line with wind speed and a third sub-nominal zone between the second sub-nominal zone and the nominal zone comprising a first vertical segment at a generator speed $n_{r2}$ higher than the generator nominal speed $n_{r1}$ and a second vertical segment at the generator nominal speed $n_{r1}$ connecting with the nominal zone, each of both segments to be followed in function of the wind speed changes for optimizing the energy production.

In one preferred embodiment, the generator speed $n_{r2}$ is comprised in a range of 85%-95% the maximum generator speed $n_{out}$. Hereby it is achieved a control method that optimize the energy production keeping a security margin between the operational generator speed and the converter auto protection speed.

In another preferred embodiment said first vertical segment and said second vertical segment have, respectively, upper and lower points C, E at two power predetermined values P1, P2 defining the paths C-D; E-F to be followed between them. Hereby it is achieved a control method that optimize the energy production minimizing the drawbacks associated to the use of said first and second vertical segments.

In another preferred embodiment said power value P1 is comprised in a range of 85%-95% the power nominal value. Hereby it is achieved a control method that optimize the energy production minimizing the drawbacks associated to high torques and high angular speeds.

In another preferred embodiment said power value P2 is comprised in a range of 110% Pi-90% P1, being Pi the value of the power at the intersection point I between the second sub-nominal zone and a vertical line at the generator nominal speed $n_{r1}$. Hereby it is achieved a control method that optimize the energy production minimizing the drawbacks associated to fatigue loadings.

In another aspect the above-mentioned objects are met by providing a variable speed wind turbine controlled by the above-mentioned method. In a preferred embodiment, the wind turbine generator is a doubly fed induction generator. Hereby it is achieved a way for improving the energy production of many already installed wind turbines.

Other features and advantages of the present invention will be understood from the following detailed description in relation with the enclosed drawings.

DETAILED DESCRIPTION OF PREFERRED EMBODIMENTS

Figure 1:
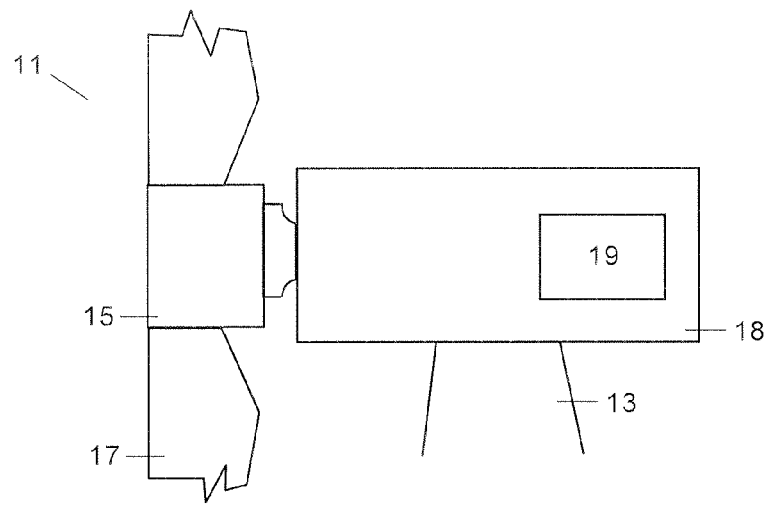
FIG. 1 shows schematically the main components of a wind turbine.

A typical wind turbine 11 comprises a tower 13 supporting a nacelle 18 housing a generator 19 for converting the rotational energy of the wind turbine rotor into electrical energy. The wind turbine rotor comprises a rotor hub 15 and, typically, three blades 17. The rotor hub 15 is connected either directly or through a gearbox to the generator 19 of the wind turbine for transferring the torque generated by the rotor 15 to the generator 19 and increase the shaft speed in order to achieve a suitable rotational speed of the generator rotor.

The power output from a modern wind turbine is typically controlled by means of a control system for regulating the pitch angle of the rotor blades and the generator torque. The rotor rotational speed and power output of the wind turbine can hereby be initially controlled e.g. before a transfer to a utility grid through a converter.

The basic aim of the methods of operation of variable speed wind turbines is to achieve an operation at the ideal aerodynamic output for as much of the time as possible.

As it is known, the kinetic energy associated with a wind current depends on the area swept by that current, on its density and on the cube of the wind speed and it is considered that wind turbines can extract up to 59% of this energy. Accordingly, we represent the capacity of each wind turbine to approach this limit by the so-called power coefficient Cp which is determined by its aerodynamic characteristics, particularly by its tip-speed ratio $\lambda$ which is defined as the relationship between the tangential speed of the blade tip and the speed of the incident wind. If we can keep this ratio at the maximum power coefficient Cp of the wind turbine so that the rotor speed follows the wind speed we can achieve an extremely efficient wind turbine.

The control strategy generally used in variable speed wind turbines is based on electrically adjusting the generator's torque to achieve the maximum output and this is carried out using a controller which receives signals indicating the speed of the generator and the power produced by the generator and which provides a torque reference signal to the converter to obtain the required power.

Accordingly, the wind turbine controller uses a curve which defines the desired functional relationship between power and speed to achieve ideal output.

Figure 2:
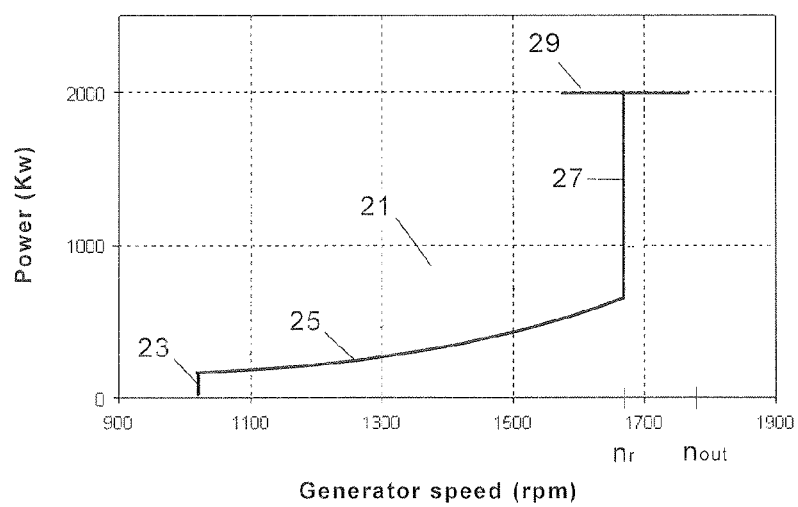
FIG. 2 shows a prior art Power vs. Generator speed curve used for controlling a variable speed wind turbine.

For a better understanding of the present invention a brief description of a typical prior art power vs. speed curve 21, shown in FIG. 2, follows.

This curve comprises a first sub-nominal zone 23 where the wind speed attains the minimum level for starting the wind turbine operation. In this zone, the wind turbine control is limited since the wind turbine can not capture the maximum energy. The second sub-nominal zone 25 corresponds to wind speeds in the range 4-8 m/s, where generator speed increases and the turbine is running with optimum power coefficient Cp. The third sub-nominal zone 27 corresponds to wind speeds in the range 8-13 m/s where the generator speed is kept constant at the nominal generator speed $n_{r1}$ while power increases up to the nominal power. Within this zone the pitch angle is fixed and generator speed is controlled via torque. At the nominal zone 29 the full load wind turbine operation at nominal power takes place under pitch control to avoid overloads.

Figure 3:
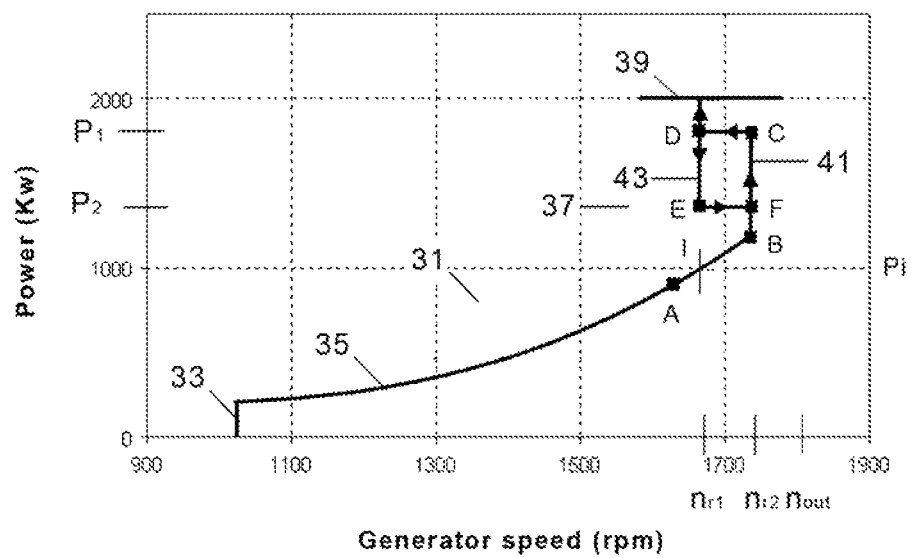
FIG. 3 shows a Power vs. Generator speed curve for controlling a variable speed wind turbine according to the present invention.

The main difference between the power curve 31 according to the present invention, shown in FIG. 3, and the prior art power curve 21 refers to the third sub-nominal zone 37 that comprises a first vertical segment 41, at a generator speed $n_{r2}$ higher than the generator nominal speed $n_{r1}$, and a second vertical segment 43 at the generator nominal speed $n_{r1}$ connecting with the nominal zone 39, with corresponding points C; E in said vertical segments 41, 43 at two power predetermined values P1, P2 defining the paths C→D; E→F for changing the generator speed references between them in function of the wind speed changes that allows optimizing the energy production.

The aim to increase the rotational speed and power above the nominal speed value in the sub-nominal zone 37 is to follow the optimum production strategy, i.e. maintaining the values of $\lambda$ and pitch angle constant and equal to the ones that make Cp maximum. In those conditions the power curve has the following expression in quasistationary conditions: $P = K_{opt}\Omega^3$.

Accordingly the evolution of the wind turbine operation in said sub-nominal zone 37 will be the following:

The first vertical segment of 41 begin in point B at a generator speed $n_{r2}$ higher than generator nominal speed $n_{r1}$. Therefore when the wind turbine is operating in a point A in the first sub-nominal zone 35, close to the generator nominal speed $n_{r1}$, the generator speed reference is fixed to the $n_{r2}$ value.

If the wind speed increases the operational point is moved from A to B. Therefore instead of following a vertical segment at the generator nominal speed $n_{r1}$ as in the prior art, the wind turbine operation continues evolving in the optimum production strategy.

If the wind speed continues increasing, the operational set point is moved from B towards C along said first vertical segment 41. Once the power produced gets to the predetermined upper limit P1 the generator speed reference is changed to the second vertical segment 43 so the operational set point is moved to D.

Once the wind turbine operational state is in D, if the wind speed continues increasing the operational point is moved to the nominal zone 39 along the second vertical segment 43. Otherwise, if the wind speed decreases the operational point is moved along the second vertical segment towards 43 point E, at the lower limit P2.

If the operational point is in E and the wind speed decreases, the power produced is going to be below the lower limit P2, then the generator speed reference is moved to the point F in the first vertical segment 41.

Once the operational point is in F, if the wind speed increases it will evolve towards C and if the wind speed decreases it will evolve towards B along the first vertical segment 41 in both cases.

If the operational point is in B and the wind speed decreases it will evolve towards A in the second sub-nominal zone 35.

The method considered in this invention is implemented using the means available in the control systems of variable speed wind turbines. These control systems comprise on the one hand devices for measurement of relevant variables such as the acceleration of the tower, wind speed, generator speed or the power produced at each instant and on the other hand processing means which allow to set up operational references for the wind turbine such as the torque demanded by the generator.

Figure 4:
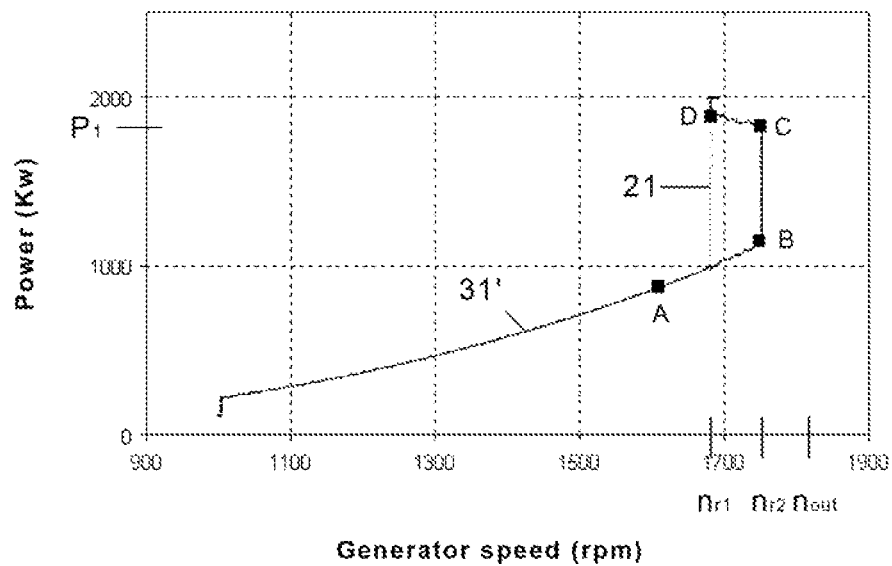
FIGS. 4-5 show Power vs. Generator speed curves according to the present invention and to the prior art used in a simulation for one ascending and one descending wind ramps.
Figure 5:
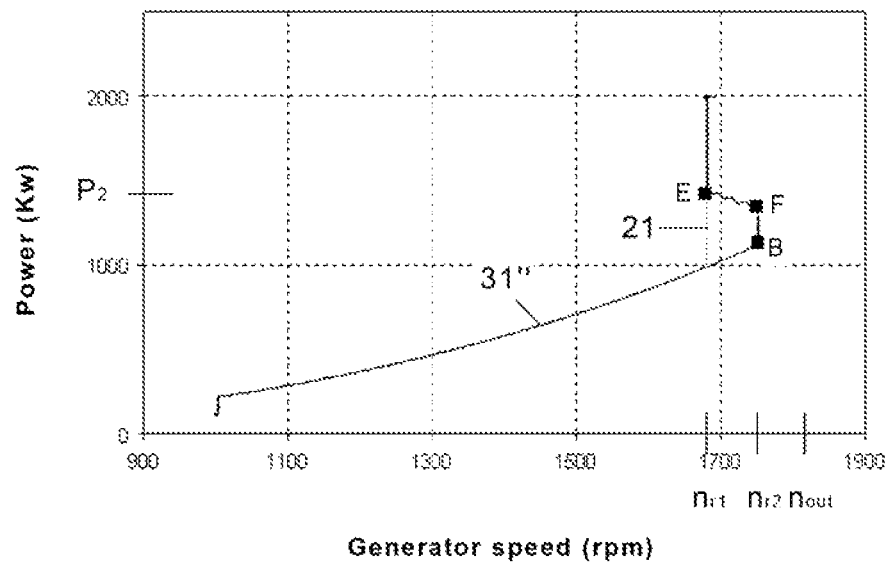

FIGS. 4 and 5 show the Power vs. Generator speed curves 31', 31" resulting of a simulation in an environment corresponding to a doubly feed electrical machine with a generator having a pair of poles for, respectively, a ramp of wind speed from 4 m/s to 21 m/s during 1000 s and a ramp of wind speed from 21 m/s to 4 m/s applying the method according to this invention and the curve 21 applying the above-mentioned prior art method.

The generator speed nominal value in this case is $n_{r1}$=1680 rpm. The value of $n_{r2}$ has been determined leaving a security margin with respect to the converter auto protection speed (the maximum generator speed) $n_{out}$=1900 rpm in this case, considering the generator speed variations taking place while it is being controlled. A value of $n_{r2}$=1750 rpm has been used, i.e. leaving a margin of a 7.89% with respect to the maximum generator speed. In the determination of the value of $n_{r2}$ aerodynamic noise considerations can also be taken into account as the noise has a close relation with the blade tip speed.

The value of P1 has been determined leaving a security margin with respect to the nominal power (2000 kW in this case) so that high load levels that could come from a combination of high torque and high angular speed are avoided. A value of P1=1800 kW has been used, i.e. leaving a margin of a 10% with respect to the nominal power.

The value of P2 has been determined as a value between the value of P1 (1800 Kw) and a power Pi of 1000 Kw at the intersection point I of the first sub-nominal zone 35 and a vertical line at the nominal generator speed $n_{r1}$ of the power curve 31 leaving an adequate margin between them to have a good equilibrium between having a high number of transitions (which affects components fatigue loading) and the maximization of energy production. Said margins are defined considering the dynamics of the drive train and the controller. A value of P2=1300 Kw has been used leaving a margin of a 27.78% with respect to P1 and a margin of a 30% with respect to Pi.

Figure 6:
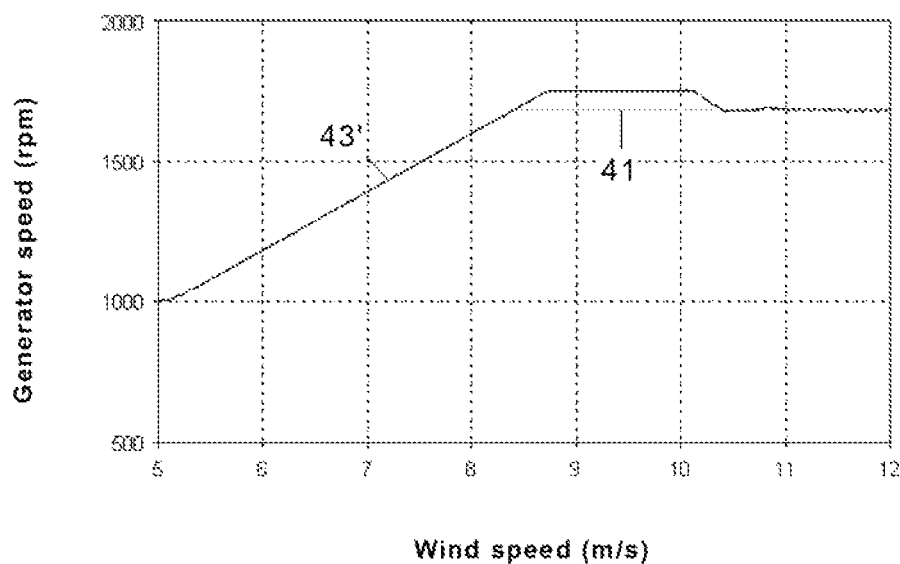
FIGS. 6-7 show the Generator Speed vs. Wind Speed curves resulting in said simulation.
Figure 7:
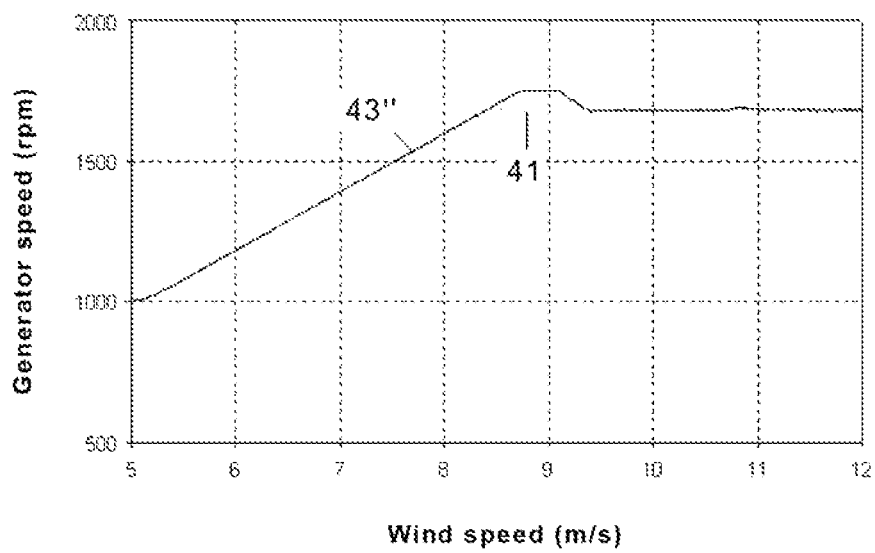

FIGS. 6 and 7 show the Generator speed vs. Wind Speed curves 43', 43" resulting of the above-mentioned simulation applying the method according to this invention and the curve 41 applying the above-mentioned prior art method.

Figure 8:
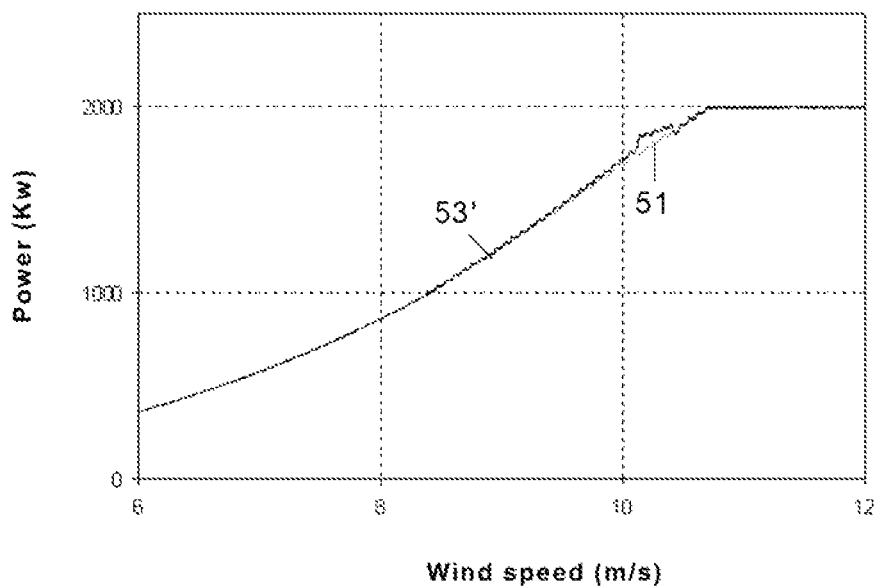
FIGS. 8-9 show the Power vs. Wind Speed curves resulting in said simulation.
Figure 9:
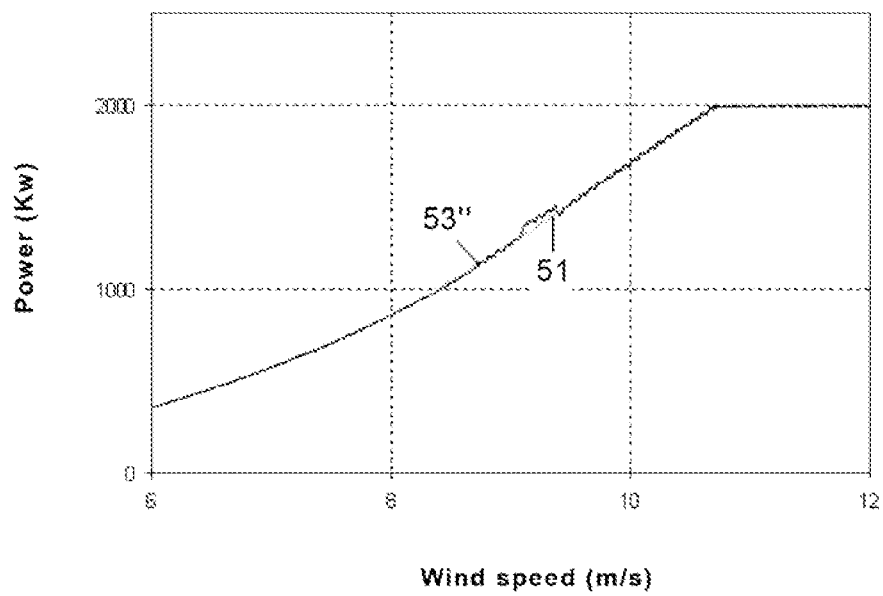

FIGS. 8 and 9 show the Power vs. Wind Speed curves 53', 53" resulting of the above-mentioned simulation applying the method according to this invention and the curve 51 applying the above-mentioned prior art method.

Figure 10:
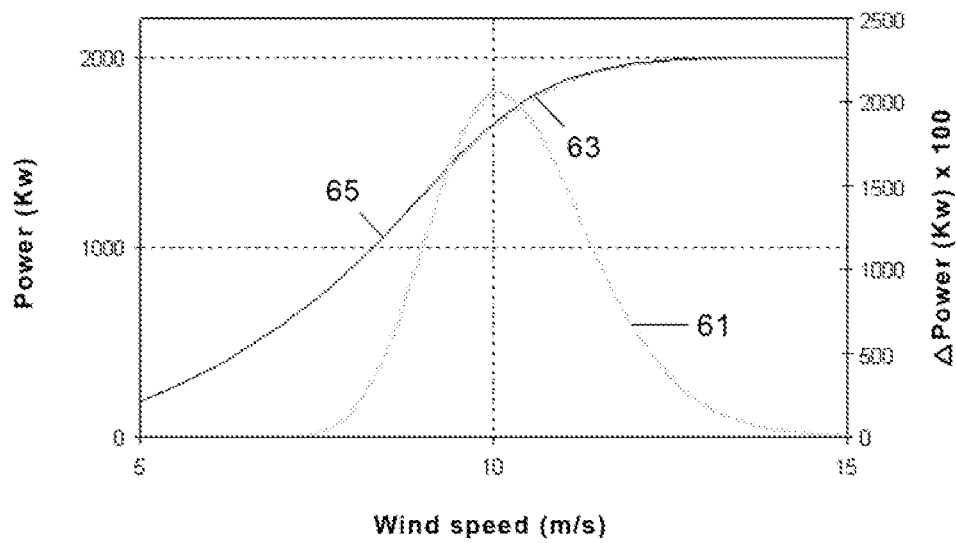
FIG. 10 show estimated averaged Power curves applying the method according to this invention and to said prior art method.

FIG. 10 show respectively the average power curve 65 that can be constructed considering the effect of a applying the method according to this invention, the curve 63 applying the above-mentioned prior art method and the delta power curve 61.

As mentioned before the parameters $n_{r2}$, P1, P2 are determined taking into account several features of the wind turbine and particularly the generator typology.

According to the studies and simulations performed by the applicant it can be considered that for at least many of the wind turbines already installed the values of said parameters are comprised on the following ranges:

The generator speed $n_{r2}$ is comprised in a range of 85%-95% the maximum generator speed $n_{out}$.

P1 is comprised in a range of 80%-90% the power nominal value.

P2 is comprised in a range between 110% Pi and 90% P1.

Although the present invention has been fully described in connection with preferred embodiments, it is evident that modifications may be introduced within the scope thereof, not considering this as limited by these embodiments, but by the contents of the following claims.

The invention claimed is:

1. A control method for controlling a variable speed wind turbine to improve electrical energy production of said variable speed wind turbine, said variable speed wind turbine having a standard regulation based on tracking an electrical power versus generator speed curve (31), wherein the electrical power versus generator speed curve has a nominal zone (39) where electrical power is kept constant at a nominal value, a first sub-nominal zone (33 where generator speed is kept constant at a coupling value related to mechanical coupling of a drive train of the wind turbine, a second sub-nominal zone (35) where both the generator speed and the electrical power are allowed to increase or decrease with wind speed, and a third sub-nominal zone (37) between the second sub-nominal zone (35) and the nominal zone (39), wherein the third sub-nominal zone (37) comprises a first vertical segment (41) at a generator speed ($n_{r2}$) higher than a generator nominal speed ($n_{r1}$) and a second vertical segment (43) at the generator nominal speed ($n_{r1}$) connecting with the nominal zone (39), said first vertical segment and said second vertical segment being connected by an upper horizontal path (C-D) at a first point (C) and a second point (D) and a lower horizontal path (E-F) at a third point (E) and a fourth point (F), wherein each of said first vertical segment and said second vertical segment to be followed in function of the wind speed changes for optimizing the electrical energy production, said control method comprising:

implementing a control strategy to follow said generator speed curve (31) in said nominal zone (39) based on the following evolution of operation of the wind turbine in said third sub-nominal zone (37):

if the wind speed increases, an operational point of the wind turbine in said second sub-nominal zone (35) is moved from said generator nominal speed ($n_{r1}$) to said generator speed ($n_{r2}$) in said third sub-nominal zone (37);

if the wind speed continues increasing, the operational point in said third sub-nominal zone (37) is moved up along said first vertical segment (41) to a power predetermined value ($P_1$) at said first point (C) where the generator speed is kept constant;

once the operational point gets to said power predetermined value ($P_1$) at said first point (C), said generator speed ($n_{r2}$) is moved along said upper horizontal path (C-D) to said generator nominal speed ($n_{r1}$) at said second point (D);

if the wind speed continues increasing when the operational point is at said first point (C), the operational point in said third sub-nominal zone (37) is moved along said second vertical segment (43) to the nominal zone (39) where said generator nominal speed ($n_{r1}$) is kept constant, otherwise, if the wind speed decreases, the operational point in said third sub-nominal zone (37) is moved down along the second vertical segment (43) to a power predetermined value ($P_2$) at said third point (E) lower than said power predetermined value ($P_1$);

if the operational point is at said third point (E) and the wind speed decreases, the electrical power is going to be below the power predetermined value ($P_2$), then the generator speed reference is moved along said lower horizontal path (E-F) to said first vertical segment (41) at said fourth point (F);

if the wind speed increases when the operational point is at said fourth point (F), the operational point is moved up along said first vertical segment (41) to said power predetermined value ($P_1$) at said first point (C), and if the wind speed decreases when the operational point is at said fourth point (F), the operational point is moved down to said second sub-nominal zone (35).

2. The control method of claim 1, wherein the generator speed $n_{r2}$ is comprised in a range of 85%-95% a maximum generator speed $n_{out}$.

3. The control method of claim 1, wherein the first vertical segment (41) and said second vertical segment (43) have, respectively, upper and lower points (C; E) at two power predetermined values $P_1$, $P_2$ defining horizontal paths (C-D; E-F) to be followed between them.

4. The control method of claim 3, wherein said power value $P_1$ is comprised in a range of 85%-95% the nominal value of the power.

5. The control method of claim 3, wherein the power value $P_2$ is comprised in a range of 110% $P_1$-90% $P_1$, being $P_1$ the value of the power at an intersection point (I) between the second sub-nominal zone (35) and a vertical line at the generator nominal speed $n_{r1}$.

6. A variable speed wind turbine (11) controlled by the control method as claimed in claim 1.

7. The variable speed wind turbine (11) of claim 6, wherein the wind turbine generator is a doubly fed induction generator.

* * * * *